United States Patent [19]

Tate

[11] Patent Number: 4,636,447

[45] Date of Patent: Jan. 13, 1987

[54] BATTERY TERMINAL AND CONNECTOR

[76] Inventor: Roland D. Tate, P.O. Box 127, Bellevue, Tex. 76228

[21] Appl. No.: 485,871

[22] Filed: Apr. 18, 1983

[51] Int. Cl.$^4$ ............................................. H01M 2/30
[52] U.S. Cl. .................................... 429/121; 429/178
[58] Field of Search ................. 429/179, 183, 121, 89, 429/178

[56] References Cited

U.S. PATENT DOCUMENTS

| | | | |
|---|---|---|---|
| 1,316,035 | 9/1919 | Hazelett | 429/89 |
| 1,654,705 | 1/1928 | Schlossnagel | 429/89 |
| 2,132,793 | 10/1938 | Kyle | 429/179 |
| 3,303,056 | 2/1967 | Sabatino et al. | 429/179 |
| 3,711,335 | 1/1973 | Daniel | 429/179 |
| 4,042,759 | 8/1977 | Cella | 429/121 |
| 4,219,612 | 8/1980 | Tatlock | 429/89 |
| 4,328,290 | 5/1982 | Szymborski et al. | 429/89 |

Primary Examiner—Donald L. Walton
Attorney, Agent, or Firm—Arthur F. Zobal

[57] ABSTRACT

A terminal member for a battery has an aperture formed therein for receiving the male member of a connector. The aperture is basically cylindrical in shape. It has a radially inward extending wall member formed on one side thereof defining an arcuate shaped slot between the radially inward extending wall member and the closed end of the aperture. The male member comprises a main portion which is basically cylindrical in shape. It has an arcuate shaped member extending radially outward thereof from one side. The male member may be inserted into the aperture of the terminal member and rotated relative to the terminal member to wedge the arcuate shaped member into the slot to secure the male member in the aperture of the terminal member.

4 Claims, 6 Drawing Figures

U.S. Patent      Jan. 13, 1987      4,636,447
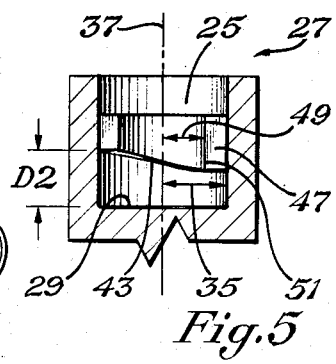
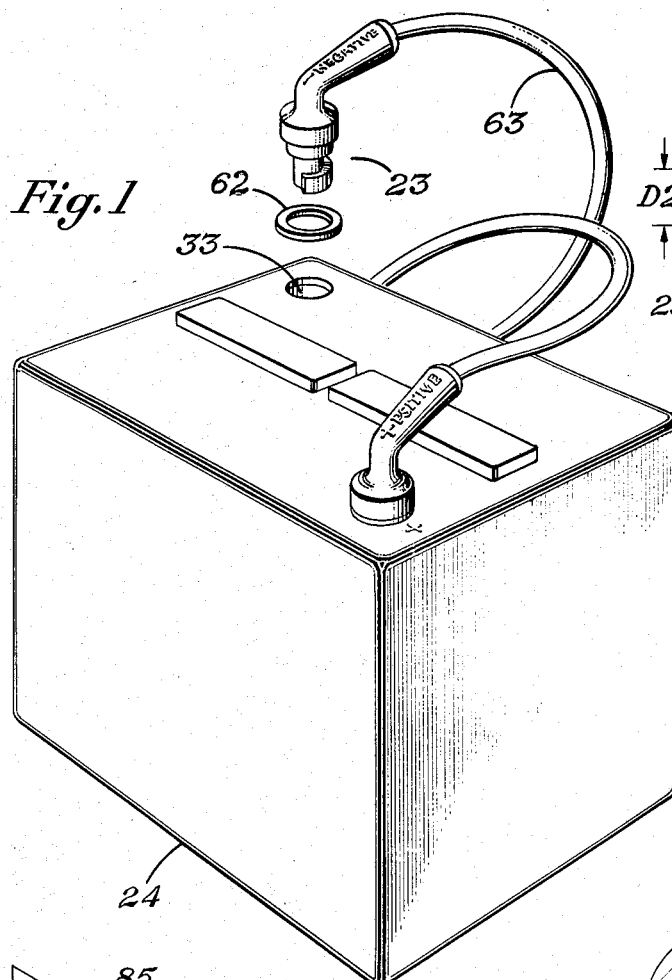

BATTERY TERMINAL AND CONNECTOR

BACKGROUND OF THE INVENTION

1. Description of the Prior Art

A need exists for a satisfactory quick-connect, quick-disconnect connector and terminal for a battery of a motor vehicle which do not require the use of tools. The following U.S. Patents disclose different types of connectors and terminals for batteries which are unsatisfactory for various reasons:

U.S. Pat. Nos. 768,175; 1,421,017; 1,507,936; 1,627,442;1,770,975; 3,670,297; 3,992,075; 4,042,759.

2. Summary of the Invention

It is an object of the present invention to provide a novel and useful battery terminal and connector which may be readily connected and disconnected and which do not require the use of tools.

The terminal member for the battery has an aperture formed therein for receiving the male member of a connector. The aperture is basically cylindrical in shape with wall means extending radially inward from the wall of said aperture on one side thereof defining an arcuate shaped slot on said one side. The connector comprises a male member having a main portion which is basically cylindrical in shape. An arcuate shaped member extends radially outward from one side of the main portion. The male member may be inserted into the aperture and rotated relative to the terminal member to wedge the arcuate shaped member into the slot to secure the male member in the aperture whereby a good mechanical and electrical connection is obtained. The connector may be removed by rotating the male member in an opposite direction and removing the male member from the aperture of the terminal member.

BRIEF DESCRIPTION OF THE DRAWINGS

FIG. 1 illustrates two battery terminals and connectors of the present invention employed for use with a battery of the type used by motor vehicles such as automobiles, trucks, etc.

FIG. 2 is a cross-section of the battery terminal of the present invention with the male member of the connector of the present invention being shown located therein.

FIG. 3 is a cross-section of FIG. 2 taken along the lines 3—3 thereof.

FIG. 4 is a cross-section of FIG. 2 taken along the lines 4—4 thereof.

FIG. 5 is a cross-section of the battery terminal of the present invention as seen along the lines 5—5 of FIG. 4. The connector and its male member are not shown in FIG. 5.

FIG. 6 is another view of the connector of the present invention.

DESCRIPTION OF THE PREFERRED EMBODIMENT

Referring now to the drawings, the terminal member and connector of the present invention are identified at 21 and 23 respectively. The terminal member 21 has an aperture 25 extending from an open top end 27 to a closed bottom end 29. The terminal member 21 is connected to the appropriate components of a battery 24 and preferably is supported such that its top end 27 is located below the top wall 31 of the battery 24 with its aperture 25 in alignment with an aperture 33 formed through the top wall 31 of the battery.

The aperture 25 is basically cylindrical in shape and has a given radius 35 relative to its central axis 37. At a position spaced from the bottom end 29, a wall member 39 extends radially inward from the main wall 41 of the aperture 25 on one side thereof defining a shoulder 43 which faces the bottom end 29 of the aperture 25. The arc of the wall member 39 as shown in FIGS. 4 and 5 extends from a side end 45 to a side end 47 and preferably is less than 180°. The radius 49 of wall member 39 from its inner wall 51 to the axis 37 is less than the radius 35. The shoulder 43 extends from side end 45 gradually downward, relative to the bottom end 29, to side end 47 defining a wedge shaped slot 53 which is arcuate in shape.

The connector 23 has one end 61 connected to a flexible lead 63 and a male member 65 with a free end 66 adapted to be located in the aperture 25 of the terminal member 21 and secured therein by turning the connector 23 and hence the male member 65 relative to the terminal member 21. The end portion 61 of the connector is enlarged such that it will not fit within the aperture 25. The enlarged portion 61 has a flat lower surface 61A which bears against a resilient or flexible washer 62 when the male member is located in the aperture and secured therein such that the washer 62 prevents liquid and other contaminates from entering the aperture 25. The male member 65 has a cylindrical shaped portion 67 and a main portion 69 which also is basically cylindrical in shape. The radius 71 of the cylindrical shaped portion 67 relative to a central axis 72 of the male member 65 is slightly less than the radius 35 of the aperture 25 whereby the male member portion 67 will fit into the aperture 25 and can be freely turned therein. The basic radius 73 of the main portion 69 is slightly less than the radius 49 of wall member 39 of the aperture 25 whereby the main portion 69 can be freely turned relative to the inside wall 51 of wall member 39 when the male member 65 is located in the aperture 25 as shown in FIG. 2.

An arcuate shaped member 75 is formed at the free end 66 of the male member 65 and extends radially outward from the main portion 69 on one side thereof. The radius 77 of member 75 is the same as that of the radius 71 whereby member 75 can fit in aperture 25 and turn therein. The arc of member 75 preferably is less than the arc of the wall member 39 and extends from an end portion 79 to a connecting portion 81 which in turn extends from member 67 to member 75 at one end thereof. The radius of the connecting portion 81 from the axis 72 is the same as that of radius 71. A shoulder 83 is formed on the member 75 which extends from the end portion 79, gradually away from the free end 66, to point 84 next to the connecting portion 81. Thus the member 75 defines an arcuate shaped wedge. The dimension D1 of the end portion 79 of member 75 is less than the distance D2 of the shoulder 43 from the closed end 29 at the end portion 45. The distance D3 of the shoulder 83 of member 75 at point 84 from the free end 66 is greater than D2. The slope of the shoulder 83 of member 75 is slightly greater than the slope of the shoulder 43 of the member 39. Thus the male member 65 may be rotated in the appropriate direction to wedge the member 75 into the slot 53 to secure the male member 65 in the aperture 25.

The connector 23 is connected to the terminal member 21 by inserting the male member 65 into the aperture 25 and rotating the connector 23 and hence the male member 65 in the appropriate direction to wedge the member 75 into the slot 53 such that the free end 66 engages the closed end 29 and the shoulder 83 engages the shoulder 43. Rotation of the connector 23 about one half of a turn is sufficient to make the desired mechanical and electrical connection between the connector 23 and the terminal member 21. Member 85 of the connector forms a relative rigid handle whereby connection and disconnection may be carried out by hand without the need of tools. The connector may be removed by rotating the connector in the opposite direction to remove the member 75 from the slot 53 whereby the male member 65 may be removed from the aperture 25. Thus connection and disconnection may be carried out readily without the need of any tools.

In one embodiment, the terminal member 21 and the connector 23 comprising member 61, member 85 and the male member 65 which includes member 67, main portion 69, and member 75 are formed of lead.

Although the terminal member 21 is shown located at the top of the battery 24, it is to be understood that it could be located on the side of the battery if desired.

I claim:

1. A battery terminal and connector, comprising:
   a terminal member for a battery having an aperture formed therein,
   said aperture having a round closed end and a portion defined by a cylindrical shaped wall portion extending away from said round closed end to an open end,
   said cylindrical shaped wall portion having a given radius relative to a central axis of said aperture,
   an arcuate shaped wall means located between said closed end and said open end and spaced from said closed end and from said open end,
   said arcuate shaped wall means having a radius relative to the central axis of said aperture which is less than said given radius such that said arcuate shaped wall means extends radially inward from said cylindrical shaped wall portion and defines a shoulder facing said closed end,
   the arc of said arcuate shaped wall means being less than a full circle and extending from a first end portion to a second end portion,
   said aperture between said first and second end portions and opposite said arcuate shaped wall means being defined by an arcuate shaped wall which is an extension of a portion of said cylindrical shaped wall portion and which has a radius relative to said central axis which is equal to that of said given radius,
   a connector having a first end adapted to be connected to a flexible lead and a male member adapted to be located in said aperture and secured therein by turning said connector and hence said male member relative to said terminal member,
   said male member having a first arcuate shaped portion at a free end opposite said first end of said connector with an arc less than that of a circle and greater than the arc of said arcuate shaped wall means of said aperture of said terminal member,
   said first arcuate shaped portion of said male member having a radius relative to a central axis of said male member which is less than the radius of said arcuate shaped wall means of said aperture of said terminal member,
   said male member having a second arcuate shaped portion at said free end with a radius relative to its central axis which is greater than the radius of said arcuate shaped wall means of said aperture of said terminal member and less than the radius of said cylindrical shaped wall portion of said aperture of said terminal member,
   the arc of said second arcuate shaped portion of said male member extending from a first end portion to a second end portion,
   said male member having a shoulder on said second arcuate shaped portion which faces towards said first end of said connector and away from said free end of said male member,
   said shoulder on said second arcuate shaped portion of said male member extending from its first end portion gradually away from said free end to its second end portion,
   said male member having a cylindrical portion near said first end of said connector opposite said free end,
   said cylindrical portion of said male member being spaced from said second arcuate shaped portion of said male member,
   said cylindrical portion of said male member extending radially outward of said first arcuate shaped portion of said male member,
   a connecting portion extending from said cylindrical portion of said male member to said second end portion of said second arcuate shaped portion of said male member,
   said connecting portion extending radially outward of said first arcuate shaped portion of said male member,
   said cylindrical portion of said male member having a radius relative to the central axis of said male member which is greater than the radius of said arcuate shaped wall means of said aperture of said terminal member and less than the radius of said cylindrical shaped wall portion of said aperture of said terminal member,
   said connecting portion having a radius relative to the central axis of said male member which is less than the radius of said cylindrical shaped wall portion of said aperture of said terminal member,
   the distance between said shoulder of said second arcuate shaped portion of said male member at its first end portion and said free end of said male member being less than the distance between said shoulder of said arcuate shaped wall means of said aperture at its first end portion and said closed end of said aperture in said terminal member whereby said male member including at least a portion of its cylindrical portion may be inserted into said aperture of said terminal member and rotated relative to said terminal member to wedge said second arcuate shaped portion of said male member between said shoulder of said arcuate shaped wall means and said closed end of said aperture of said terminal member to secure said male member in said aperture of said terminal member.

2. A battery terminal and connector, comprising:
   a terminal for a battery having an aperture formed therein,
   said aperture having a round bottom end and a lower portion defined by a cylindrical shaped wall portion extending upward from said found bottom end to an open end,
   said cylindrical shaped wall portion having a given radius relative to a central axis of said aperture, an arcuate shaped wall means located between said bottom end and said open end and spaced from said bottom end and from said open end, said arcuate shaped wall means having a radius relative to the central axis of said aperture which is less than said given radius such that said arcuate shaped wall means extends radially inward from said cylindrical shaped wall portion, the arc of said arcuate shaped wall means being less than a full circle and extending from a first end portion to a second end portion, the lower end of said arcuate shaped wall means defining a lower shoulder overhanging a portion of said bottom end of said aperture, said aperture between said first and second end portions and opposite said arcuate shaped wall means being defined by an arcuate shaped wall which is an extension of a portion of said cylindrical shaped wall portion and which has a radius relative to said central axis which is equal to that of said given radius, a connector having a first end adapted to be connected to a flexible lead and a male member adapted to be located in said aperture and secured therein by turning said connector and hence said male member relative to said terminal member, said male member having a first arcuate shaped portion at a free end opposite said first end of said connector with an arc less than that of a circle and greater than the arc of said arcuate shaped wall means of said aperture of said terminal member, said first arcuate shaped portion of said male member having a radius relative to a central axis of said male member which is slightly less than the radius of said arcuate shaped wall means of said aperture of said terminal member, said male member having a second arcuate shaped portion at said free end with a radius relative to its central axis which is greater than the radius of said arcuate shaped wall means of said aperture of said terminal member and slightly less than the radius of said cylindrical shaped wall portion of said aperture of said terminal member, the arc of said second arcuate shaped portion of said male member extending from a first end portion to a second end portion, said male member having an upper arcuate shaped portion above said second arcuate shaped portion with a radius relative to its central axis which is equal to the radius of said first arcuate shaped portion defining an upper shoulder on said second arcuate shaped portion which extends from its first end portion gradually away from said free end to its second end portion, said male member having a cylindrical portion near said first end of said connector opposite said free end, said cylindrical portion of said male member being spaced from said second arcuate shaped portion of said male member, said cylindrical portion of said male member extending radially outward of said upper arcuate shaped portion of said male member, a connecting portion extending from said cylindrical portion of said male member to said second end portion of said second arcuate shaped portion of said male member, said connecting portion extending radially outward of said upper arcuate shaped portion of said male member, said cylindrical portion of said male member having a radius relative to the central axis of said male member which is about equal to said radius of said second arcuate shaped portion of said male member, said connecting portion having a radius relative to the central axis of said male member which is about equal to said radius of said second arcuate shaped portion of said male member, the distance between said upper shoulder at said first end portion and said free end of said male member being less than the distance between said lower shoulder at said first end portion and said bottom end of said aperture in said terminal member whereby said male member including at least a portion of its cylindrical portion may be inserted into said aperture of said terminal member and rotated relative to said terminal member to wedge said second arcuate shaped portion of said male member under said arcuate shaped wall means of said aperture of said terminal member to secure said male member in said aperture of said terminal member.

3. A battery terminal and connector, comprising:

a terminal member for a battery having an aperture formed therein, said aperture being basically cylindrical in shape having a given radius relative to a central axis and having a closed end and an open end, an arcuate shaped wall means located between said closed end and said open end and spaced from said closed end and from said open end, said arcuate shaped wall means having a radius relative to said central axis of said aperture which is less than said given radius such that a shoulder is formed on said arcuate shaped wall means which faces said closed end, the arc of said arcuate shaped wall means being less than a full circle and extending from a first end portion to a second end portion, a connector having a first end adapted to be connected to a flexible lead and a male member adapted to be located in said aperture and secured therein by turning said connector and hence said male member relative to said terminal member, said male member having a main portion which is basically cylindrical in shape and has a basic radius relative to a central axis which is less than said given radius of said aperture, said male member having a free end opposite said first end of said connector, said main portion of said male member having an arcuate shaped member at said free end with a radius relative to its central axis which is greater than said basic radius of said main portion of said male member such that a shoulder is formed on said arcuate shaped member which faces toward said first end of said connector and away from said free end of said male member, the arc of said arcuate shaped member being less than a full circle and extending from a first end portion to a second end portion, said shoulder on said arcuate shaped member extending gradually from its first end portion away from said free end of said male member to its second end portion, said male member having a cylindrical portion near said first end of said connector opposite said free end, said cylindrical portion of said male member being spaced from said arcuate shaped member of said male member, said cylindrical portion of said male member extending radially outward of said main portion of said male member, a connecting portion extending from said cylindrical portion of said male member to said second end portion of said arcuate shaped member of said male member, said connecting portion extending radially outward from said main portion of said male member, said cylindrical portion having a radius relative to the central axis of said male member which is greater than the radius of said arcuate shaped wall means of said aperture of said terminal member and less than said given radius of said aperture, said connecting portion having a radius relative to the central axis of said male member which is less than said given radius of said aperture, the distance between said shoulder of said arcuate shaped member of said male member at its first end portion and said free end of said male member being less than the distance between said shoulder of said arcuate shaped wall means of said aperture at its first end portion and said closed end of said aperture in said terminal member whereby said male member including at least a portion of its cylindrical portion may be inserted into said aperture of said terminal member and rotated relative to said terminal member to wedge said arcuate shaped member of said male member between said shoulder of said arcuate shaped wall means and said closed end of said aperture of said terminal member to secure said male member in said aperture of said terminal member.

4. The battery terminal and connector, comprising:

a terminal member for a battery having an aperture formed therein, said aperture being basically cylindrical in shape and having a given radius relative to a central axis and having a closed end and an open end, wall means extending radially inward from the wall of said aperture on one side thereof defining an arcuate shaped slot on said one side, said wall means being located between said closed end and said open end and spaced from said closed end and from said open end, a connector having a first end adapted to be connected to a flexible lead and a male member adapted to be located in said aperture and secured therein by turning said connector and hence said male member realtive to said terminal member, said male member having a main portion which is basically cylindrical in shape and having a basic radius relative to a central axis which is less than said given radius of said aperture, an arcuate shaped member extending radially outward from said main portion of said male member on one side thereof and adapted to be wedged into said arcuate shaped slot of said aperture upon insertion of said male member into said aperture and rotation of said connector and hence of said male member relative to said terminal member to secure said male member in said aperture of the terminal member, said male member having a cylindrical portion near said first end of said connector, said cylindrical portion of said male member being spaced from said arcuate shaped member of said male member, said cylindrical portion of said male member extending radially outward of said main portion of said male member, a connecting portion extending from said cylindrical portion of said male member to one end of said arcuate shaped member of said male member, said connecting portion extending radially outward of said main portion of said male member, said cylindrical portion having a radius relative to the central axis of said male member which is greater than the radius of said wall means of said aperture of said terminal member and less than said given radius of said aperture, said connecting portion having a radius relative to the central axis of said male member which is less than said given radius of said aperture, said cylindrical portion of said male member being adapted to be located at least partially in said aperture upon insertion of said male member into said aperture.

* * * * *